G. K. PARKER.
FISH SCREEN OR BARRIER.
APPLICATION FILED OCT. 2, 1913.
1,129,005.
Patented Feb. 16, 1915.
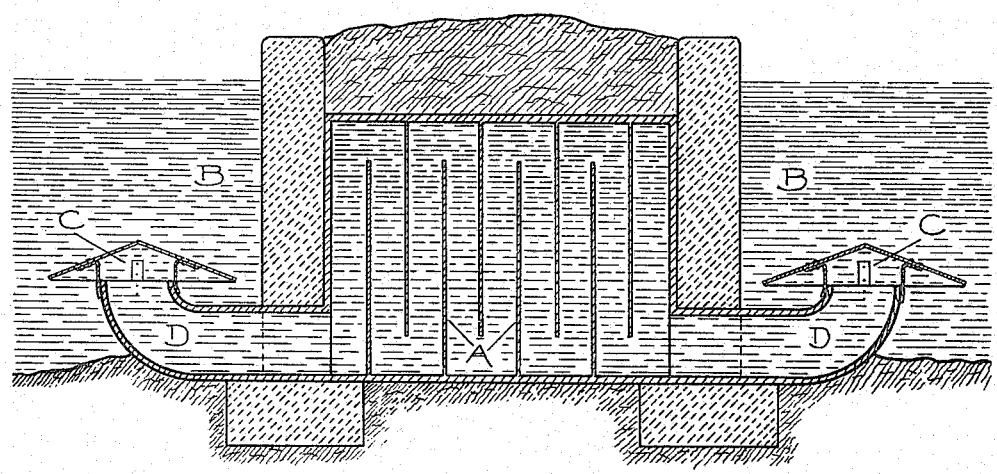
Witnesses
Inventor

UNITED STATES PATENT OFFICE.

GEORGE KEMPTON PARKER, OF OGDEN, UTAH.

FISH SCREEN OR BARRIER.

1,129,005.     Specification of Letters Patent.    Patented Feb. 16, 1915.

Application filed October 2, 1913. Serial No. 792,966.

*To all whom it may concern:*

Be it known that I, GEORGE KEMPTON PARKER, a citizen of the United States, residing at Ogden city, in the county of Weber and State of Utah, have invented certain new and useful Improvements in Fish Screens or Barriers; and I do hereby declare the following to be a full, clear, and exact description of the same, reference being had to the accompanying drawing, forming part of this specification, and to the letters of reference marked thereon.

This invention relates to screens or barriers designed for preventing or discouraging the passage of fish and similar marine life from one water way to another, and is especially applicable for use in irrigation operations where the fish tend to run into the laterals and so ultimately find themselves in water which will not maintain life, the result being that the streams are rapidly depopulated wherever irrigation projects are carried out.

In the provision of means for preventing or discouraging the movement of fish in the manner stated it has been found to be impractical to make use of mesh or bar screens, inasmuch as such screens tend to accumulate debris of all kinds, with the result that the flow of water is retarded or entirely checked with resultant damage to the ditches and greater damage to the areas where the water should flow freely for irrigation purposes. It has also been found impractical to make use of barriers with mechanically moved parts owing to the cost of installation and attendants necessary for their successful operation.

It is the object of the present invention to provide an arrangement whereby the difficulties heretofore encountered by the use of mesh or bar screens or of barriers with moving parts will be entirely overcome by the provision of an apparatus which will make use of the fact that fish and similar marine life shun a passageway from which all rays of light are absolutely excluded, thus making it possible to provide for a free and unobstructed flow of the water with little or no liability of clogging with an accumulation of debris and requiring no attention for its successful operation in performing the primary function of passing the water for irrigation purposes.

In the particular form of apparatus adopted for illustrating the invention, as shown in the accompanying drawing, which is a vertical section longitudinally of the apparatus, a chamber or passageway is provided adapted for connecting two bodies of water B—B, one of which is the affluent and the other the effluent. The chamber is provided with intake and outlet openings D preferably in the form of curved or elbow pipes to the ends of which hoods C—C may be fitted and on the interior of the chamber alternately arranged and oppositely projecting baffle plates A are provided to convert the interior of the chamber into a tortuous passageway for the water, which passageway, however, is of unrestricted cross sectional area at all points, the area being equal to the intake and outlet openings.

The curved and plane surfaces of the passageway thus formed effectually bar the entry of any rays of light into the interior of the chamber or through the passageway; thus, the passageway itself is in utter darkness, regardless of the light conditions pertaining at the surface of the affluent and effluent, and it is painted black to heighten the effect.

In this connection it may be noted that baffle plates A are located directly in line with the intake and outlet openings and the water level of both the affluent and effluent is well above the ends of the inlet and outlet openings, with the result that floating debris does not tend to enter the barrier and such debris as does enter the same finds that its passage therethrough is not obstructed by constrictions and reverse movements of the water within the passageway.

Having thus described my invention, what I claim as new and desire to secure by Letters Patent of the United States, is:

A fish screen or barrier for preventing the passage of fish from one waterway to another, embodying opaque walls forming a tortuous but free and unobstructed passageway for the water with inlet and outlet openings in the affluent and effluent, respectively, at approximately the same level and located below the water level, said walls of the passageway being arranged with portions thereof at an angle with relation to each other for completely barring the penetration of light rays into and through the passageway, whereby the water is caused to flow through the passageway in an area of utter darkness.

GEORGE KEMPTON PARKER.

Witnesses:
 CHAS. H. PARKER,
 W. S. CRAVEN.

Copies of this patent may be obtained for five cents each, by addressing the "Commissioner of Patents, Washington, D. C."